US011511575B1

(12) United States Patent
Burgess

(10) Patent No.: US 11,511,575 B1
(45) Date of Patent: Nov. 29, 2022

(54) SYSTEM FOR REMOVING AND REPLACING TIRES

(71) Applicant: Donald Burgess, Chesapeake, VA (US)

(72) Inventor: Donald Burgess, Chesapeake, VA (US)

( * ) Notice: Subject to any disclaimer, the term of this patent is extended or adjusted under 35 U.S.C. 154(b) by 60 days.

(21) Appl. No.: 16/793,072

(22) Filed: Feb. 18, 2020

(51) Int. Cl.
*B60C 25/04* (2006.01)
*B60C 25/02* (2006.01)
*B66F 15/00* (2006.01)

(52) U.S. Cl.
CPC .............. *B60C 25/02* (2013.01); *B66F 15/00* (2013.01)

(58) Field of Classification Search
CPC ................................. B60C 25/02; B66F 15/00
USPC ..................................... 157/1.3, 11
See application file for complete search history.

(56) References Cited

U.S. PATENT DOCUMENTS

| 2,555,698 A * | 6/1951 | Masheckjoseph | B60B 29/001 29/273 |
| 5,479,692 A * | 1/1996 | Barkus | B60B 29/001 29/273 |
| 5,568,956 A * | 10/1996 | Benefield | B60B 29/001 29/273 |
| 8,220,851 B1 * | 7/2012 | Dawes | B60C 25/04 294/15 |
| 9,770,953 B2 | 9/2017 | Turple | |

* cited by examiner

*Primary Examiner* — Joseph J Hail
*Assistant Examiner* — Shantese L McDonald
(74) *Attorney, Agent, or Firm* — Sanchelima & Associates PA; Christian Sanchelima; Jesus Sanchelima

(57) ABSTRACT

A system for removing and replacing tires including a removing tool assembly, a lifting tool assembly and a wheel assembly is disclosed. The removing tool includes an elongated shaft having an arcuate tire hub rest mounted perpendicularly to the distal end of the shaft. The removing tool further includes a threadably adjustable extension for securing the device in the tire rim which is mounted in an anti-parallel direction to the tire hub rest. The lifting tool includes a lifting tool shaft with a lifting base that is used to bring the wheel upright. The lifting tool also includes an inserting portion that also helps to bring the wheel upright. The inserting portion is inserted into a lug nut opening and the lifting base presses against the wheel allow the user to pull towards themselves. The upright wheel is then mounted onto the vehicle with all necessary repairs completed.

17 Claims, 4 Drawing Sheets

SYSTEM FOR REMOVING AND REPLACING TIRES

BACKGROUND OF THE INVENTION

1. Field of the Invention

The present invention relates to a system for removing and replacing tires and, more particularly, to a system for removing and replacing truck tires that facilitates the task allowing a single user to safely remove and replace the tires.

2. Description of the Related Art

Several designs for a system for removing and replacing tires have been designed in the past. None of them, however, include a tire lifting device including an elongated shaft having an arcuate tire hub rest mounted perpendicularly to the distal end of the shaft, and a threadably adjustable extension for securing the device in the tire rim which is mounted in an anti-parallel direction to the tire hub rest. Further, the system includes an additional device with a shaft that includes a distal end that can be inserted into the lug nut openings of a wheel or rim to allow for easily lifting the wheel and or tire off of a ground surface safely even alone.

Applicant believes that a related reference corresponds to U.S. Pat. No. 8,220,851 for a tire lifting apparatus for supporting and lifting an existing wheel or tire. Applicant believes another related reference corresponds to U.S. Pat. No. 9,770,953 for a tire lifting and removing tool that facilitates shifting of tires on/off the trucks or the like and holding the tire at a place. None of these references, however, teach of a tire lifting device having an arcuate tire hub rest mounted perpendicularly to the distal end of the shaft, and an adjustable extension for securing the device in the tire rim. The present invention facilitates the removal and replacement of tires for trucks safely even as the user is alone.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a system for tire removal and replacement that increases the safety of the user.

It is another object of this invention to provide a system for tire removal and replacement that allows for a user to complete the task alone.

It is an object of the present invention to provide a system for tire removal and replacement that is adjustable to cooperate with tires and wheels of different dimensions.

It is still another object of the present invention to provide a system for tire removal and replacement that increases the efficiency and speed of the user to remove and replace tires.

It is another object of the present invention to provide a system for tire removal and replacement that functions with tires of different dimensions even those of large trucks such as 18 wheelers.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
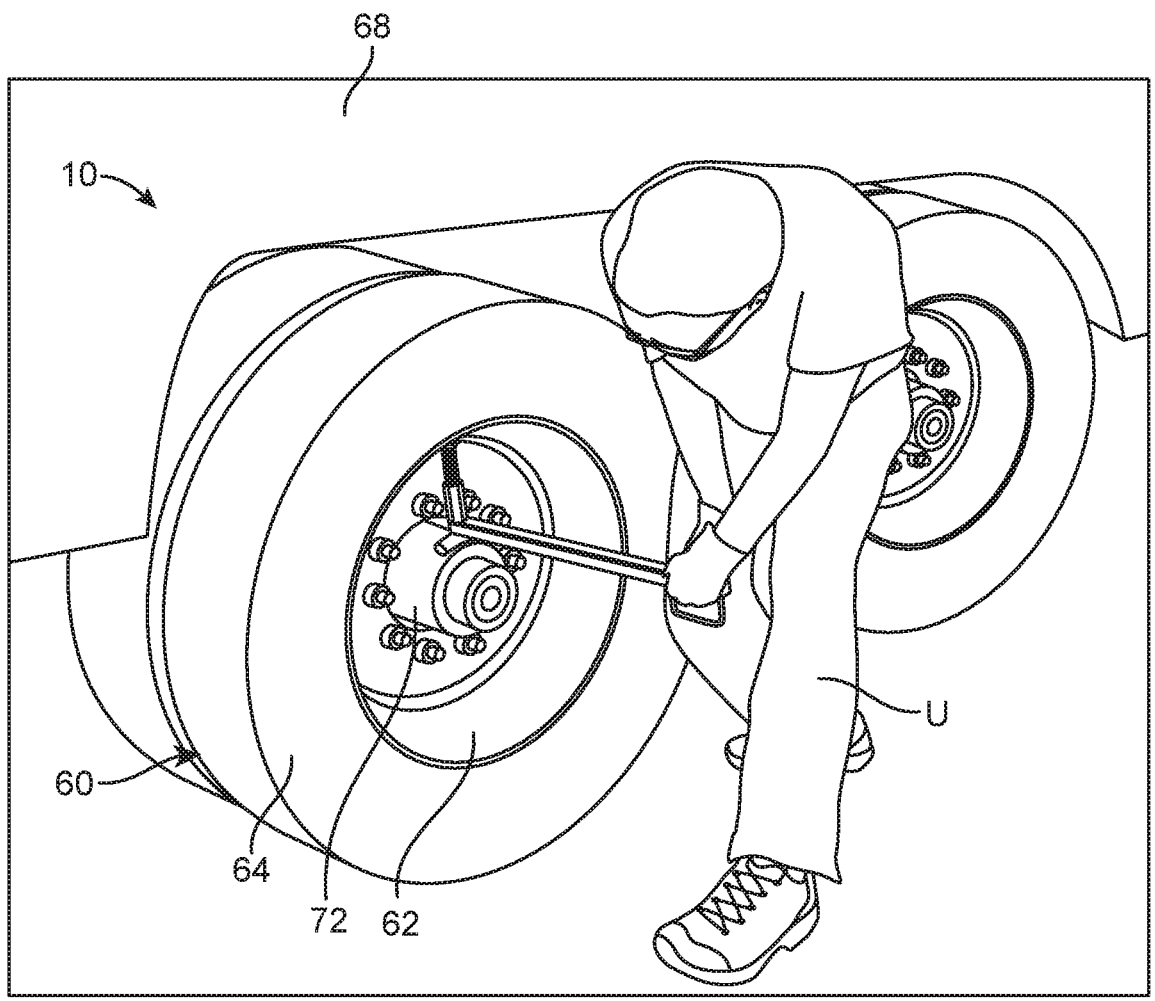
FIG. 1 represents an operational view of the removal tool 22 of the removing tool assembly 20 being used to remove a wheel 62 from a vehicle 68.

Referring now to the drawings, where the present invention is generally referred to with numeral 10, it can be observed that it, a system for tire removing and replacing 10, basically includes a removing tool assembly 20, a lifting tool assembly 40 and a wheel assembly 60.

The system for tire removing and replacing 10 helps to facilitate the job of workers replacing the tires of vehicles especially those of large trucks. This task can be taxing on the body of the user, they often deal with back aches and pains as a result. As such, the present invention helps with increasing the safety of the user. Further, the task of removing and replacing the tires, especially of large trucks, often requires multiple workers due to the size of the tires and wheels. However, with the present invention that process can safely and efficiently be completed with just one worker. The present invention further allows for the worker to be quick and efficient.

The present invention includes removing tool assembly 20 which may cooperate with wheel assembly 60. Removing tool assembly 20 may be used by a user U to safely and quickly remove a wheel 62 from a vehicle 68 for replacing a tire 64 mounted around wheel 62. Tire 64 may need replacing due to becoming flat or wear and tear, for example.

Removing tool assembly 20 may include a removal tool 22 which may be used to remove wheel 62 from vehicle 68. Removal occurs once wheel 62 has been unsecured from vehicle 68 by removing or releasing any lug nuts or other fasteners used. It may be suitable for removal tool 22 to be made of metal, stainless steel, aluminum, plastic, rubber or other suitable materials. Preferably, removal tool 22 is made of durable and strong materials that can endure daily usage.

Figure 3:
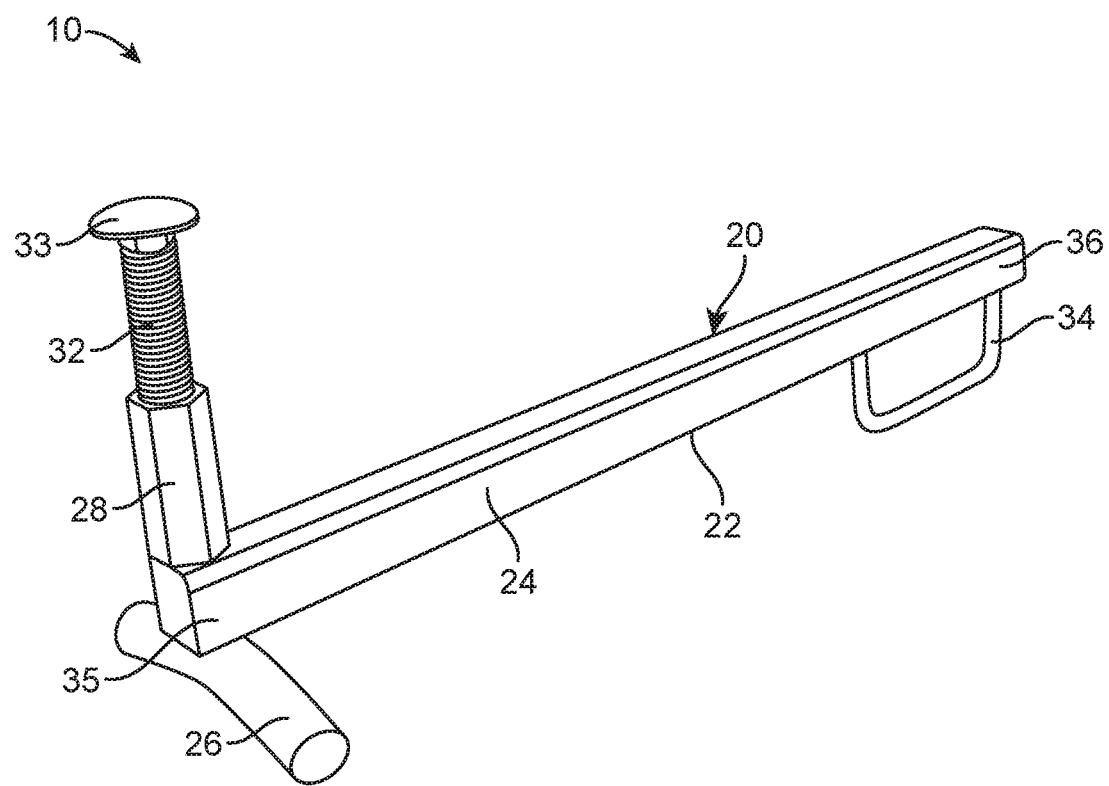
FIG. 3 represents an isometric view of the removal tool 22.

Removal tool 22 may include a removal tool shaft 24, which may be the body of removal tool 22. Removal tool shaft 24 may be an elongated shaft. It can be seen in FIG. 1 and FIG. 3 that removal tool shaft 24 may be square and elongated in shaped. However, it is not limited to being so. It is to be understood that removal tool shaft 24 may be made of other suitable predetermined shapes and dimensions. In one embodiment, removal tool shaft 24 may be hollow. It may be suitable, in an alternate embodiment, for removal tool shaft 24 to be entirely solid. Additionally, it can be seen that removal tool shaft 24 may have an opening at each distal end, a first distal end 35 and a second distal end 36.

Removal tool 22 may further include a removal tool base 26. Removal tool base 26 may be mounted perpendicularly and underneath of removal tool shaft 24, at first distal end 35. Removal tool base 26 may also be a tire hub rest. Removal tool base 26 may be mounted atop of a hub 72 of vehicle 68 when removing wheel 62. Removal tool base 26 may preferably be arcuated or curved. It can also be seen that removal tool base 26 may be substantially cylindrical and arched. Removal tool base 26 may be solid, in one embodiment. The curvature of removal tool base 26 cooperates with the shape and curvature of hub 72. Hub 72 may be round, circular or substantially cylindrical in shape. The arch of removal tool base 26 helps to securely maintain the present invention in place during usage when it is mounted on top of hub 72 to remove wheel 62.

Removal tool 22 may further include an extension holder 28 mounted to removal tool shaft 24. Preferably, extension holder 28 may be mounted perpendicularly and atop of removal tool shaft 24. Extension holder 28 may extend upwardly from removal tool shaft 24 a predetermined amount. In one embodiment, extension holder 28 may be a hexagonal prism in shape. However, it should be understood that extension holder 28 is not limited to be such a shape. It may be suitable for extension holder 28 to be cylindrical in shape, in an alternate embodiment. It may be suitable for extension holder 28 to be hollow. Extension holder 28 may be threaded along an inner surface about an entire perimeter and height thereof. Extension holder 28 may preferably have an open top face. This allows for an adjustable extension 32 of removal tool 22 to be inserted into and received by extension holder 28.

Adjustable extension 32 may be substantially threaded along a height thereof. The threading on adjustable extension 32 cooperates with the threading of extension holder 28. Adjustable extension 32 may further include an extension head 33 at a top end thereof. Extension head 33 may be domed or rounded. It can be seen that between the threaded portion and the head portion of the adjustable extension 32 may be a solid, smooth and substantially squared portion. Adjustable extension 32 may be adjustable in height to cooperate with wheel 62 of different dimensions. Adjustable extension 32 may be turned in a predetermined direction to alter the height of adjustable extension 32 within extension holder 28. Adjustable extension 32 may resemble an oversized screw.

Removal tool 22 may further include a removal tool handle 34. Preferably, removal tool handle 34 may be mounted towards second distal end 36. It may be suitable for removal tool handle 34 to be mounted underneath of removal tool shaft 24. It may be possible to have removal tool handle 34 mounted elsewhere on removal tool shaft 24 and maintain its effectiveness. It can be seen in FIG. 1 and FIG. 3 that removal tool handle 34 may be substantially U shaped. However, it should be understood that removal tool handle 34 is not limited to being such a shape. Other predetermined shapes and dimensions may be suitable for removal tool handle 34. Removal tool handle 34 may preferably be rounded and smooth. Removal tool handle 34 may also facilitate the carrying and transporting of removal tool 22. Removal tool handle 34 may permit user U to more safely and securely maintain a grip on the present invention during usage.

User U may operate removal tool 22 to safely remove wheel 62 from vehicle 68. User U may insert removal tool 22 into wheel 62 in such a manner in which removal tool base 26 in sitting on hub 72 of vehicle. Lug nuts should be removed by this point as the intent is to remove wheel 62. Subsequently, adjustable extension 32 may be adjusted until a periphery of wheel 62 has been reached by extension head 33. Afterwards, user U may move the removal tool 22 up and down to wiggle wheel 62 off of hub 72. Wheel 62 inches off of hub 62 until user U can manually take and move wheel 62 as necessary. This continued motion will cause wheel 62 to be removed and therefore allow for wheel 62 with a new of tire 64 to be secured to vehicle 68 to replace the old of wheel 62. During usage, removal tool 22 may be perpendicular to wheel 62.

When it comes time to replacing wheel 62 lifting tool assembly 40 may be used. Wheel 62 may be very heavy, especially when wheel 62 is intended for trucks and other large vehicles. Lifting wheel 62 improperly may lead to serious injury. Such injury may be strained back muscles or herniated disks, which can be difficult to recover from. Quality of life may even decline for user U from such an injury. To avoid such an occurrence, lifting tool 42 may be used. Lifting tool 42 may allow user U to pick up wheel 62 easily and safely. Once wheel 62 has been positioned in an upright manner then wheel 62 may be manually mounted onto vehicle 68 to complete the replacing of tires. It may be suitable for lifting tool 42 to be made of metal, stainless steel, aluminum, plastic, rubber or other suitable materials. Preferably, lifting tool 42 is made of durable and strong materials that can endure daily usage.

Figure 2:
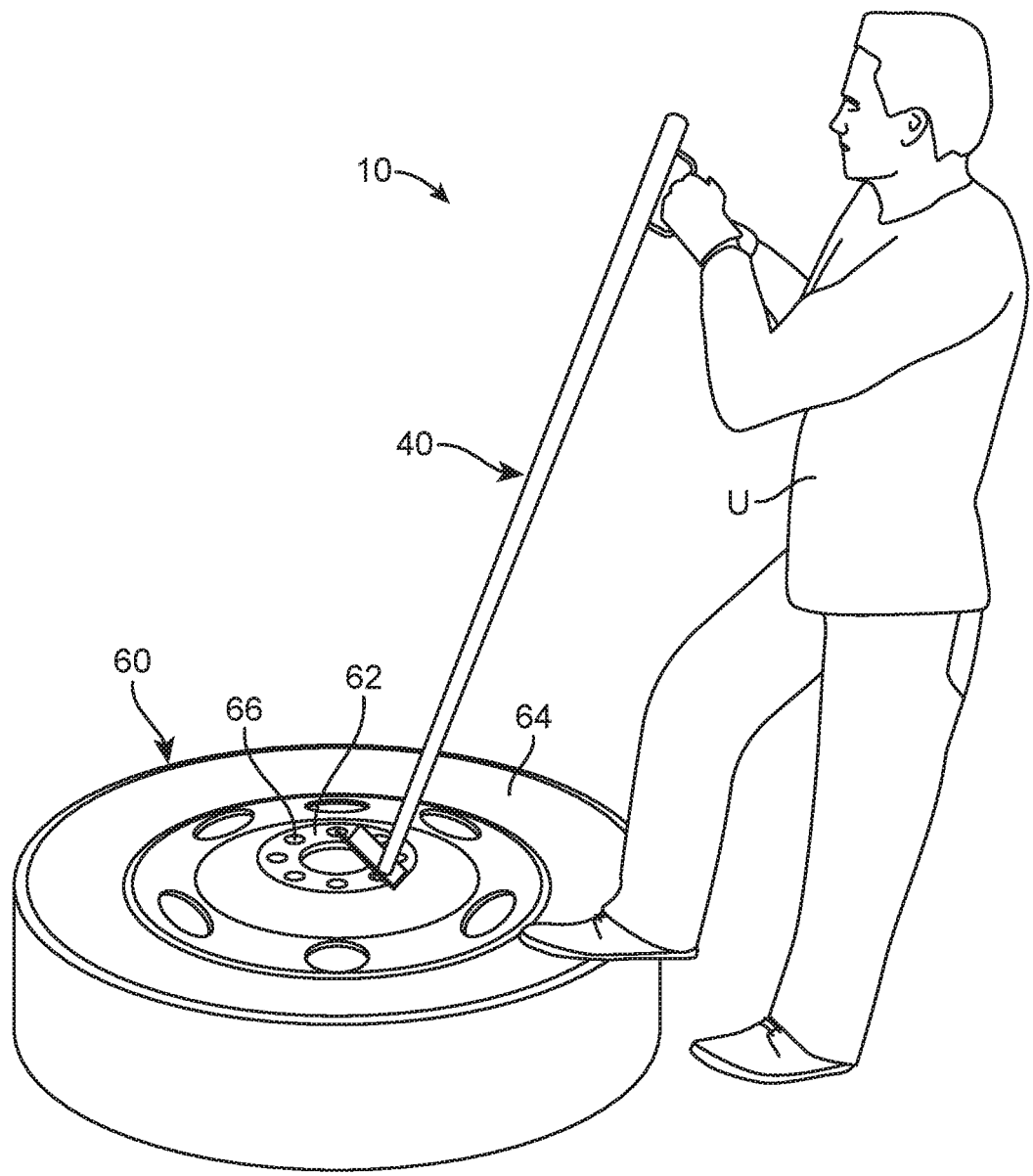
FIG. 2 represents an operational view of the lifting tool 42 of the lifting tool assembly 40 being used to lift a wheel 62 off of a ground surface to replace one of wheel 62 previously removed.
Figure 4:
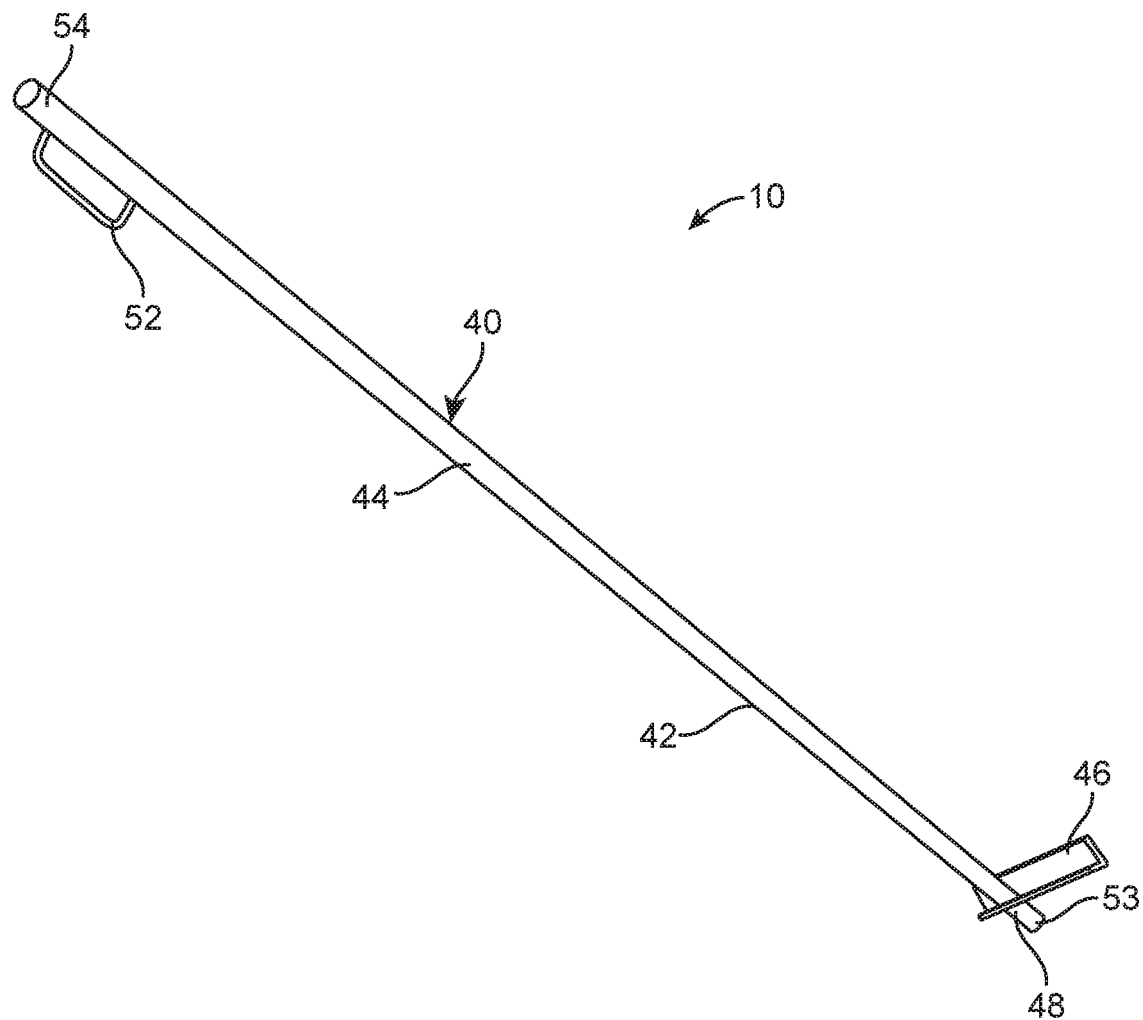
FIG. 4 represents an isometric view of the lifting tool 42.

Lifting tool 42 may include a lifting tool shaft 44, which may be the body of lifting tool 42. Lifting tool shaft 44 may be elongated and circular in shape as seen in FIG. 2 and FIG. 4. It may be suitable for lifting tool shaft 44 to be of other predetermined shapes and dimensions. In one embodiment, lifting tool shaft 44 may be hollow. It may be suitable, in an alternate embodiment, for lifting tool shaft 44 to be entirely solid. Additionally, it can be seen that lifting tool shaft 44 may have an opening at each distal end defined as a first end 53 and a second end 54.

It can be seen that towards first end 53, lifting tool shaft 44 may include a lifting base 46. Lifting base 46 may be substantially V shaped. It should also be understood that lifting base 46 may extend outwardly and away from lifting tool shaft 44. Lifting base 46 may also be angled to create an obtuse angle with lifting tool shaft 44. Lifting base 46 may be solid, in one embodiment. Lifting tool shaft 44 may extend through lifting base 46. Lifting3 base 46 may include an opening to allow for lifting tool shaft 44 to extend through. In usage, a bottom side of lifting base 46 may press against wheel 62.

Towards second end 54 may be an inserting portion 48. Inserting portion 48 may be a continuation of lifting tool shaft 44. Inserting portion 48 may be adjacent to lifting base 46. Inserting portion 48 may be on an opposite side of lifting base 46 opposite to lifting tool shaft 44. Inserting portion 48 may preferably be circular and cylindrical. Inserting portion 48 may be inserted into one of a lug nut opening 66 on wheel 62 to allow for lifting base 46 to press adjacently against wheel 62 for lifting wheel 62 to an upright position. Inserting portion 48 may create an acute angle with lifting base 46.

Lifting tool 42 may further include a lifting tool handle 52. Preferably, lifting tool handle 52 may be mounted towards second end 54. It may be suitable for lifting tool handle 52 to be mounted underneath of lifting tool shaft 44. It may be possible to have lifting tool handle 52 mounted elsewhere on lifting tool shaft 44 and maintain its effectiveness. It can be seen in FIG. 2 and FIG. 4 that lifting tool handle 52 may be substantially U shaped. However, it should be understood that lifting tool handle 52 is not limited to being such a shape. Other predetermined shapes and dimensions may be suitable for lifting tool handle 52. Lifting tool handle 52 may preferably be rounded and smooth. Lifting tool handle 52 may also facilitate the carrying and transporting of lifting tool 42. Lifting tool handle 52 may permit user U to more safely and securely maintain a grip on the present invention during usage for lifting wheel 62 off of a ground surface.

User U may operate lifting tool 42 to safely lift wheel 62 off a ground surface to allow manual mounting wheel 62 back on vehicle 68 with a new of tire 64. Wheel 62 may be lying flat on a ground surface. With wheel 62 being flat, inserting portion 48 may be inserted into lug nut opening 66. Lifting base 46 may extend over a central opening or bore of wheel 62. However, it may be suitable for lifting base 46 to be oriented as desired by user, depending on what creates the best leverage for user U. User U may then pull lifting tool 42 towards themselves to lift wheel 62 of the ground. User U may create a leverage point with their foot as well pressed against tire 64. Due to the size of wheel 62, it may be necessary for user U to rock back and forth until enough momentum is created to bring wheel 62 to a standing position. Once wheel 62 is upright, user U may manually mount wheel 62 to vehicle 68 and hub 72. Thereby completing the replacing of the tires for the vehicles such as trucks. Lifting tool 42 may be substantially perpendicular to wheel 62 during usage.

User U may safely remove wheel 62 from vehicle 68 with removal tool 22. It may then be possible to make necessary repairs or changes to the tires or rims of the trucks or vehicles. The removal of wheel can be done by at least one of user U. Once repairs are completed, user U may use lifting tool 42 to bring wheel 62 upright to then manually mount wheel 62 onto vehicle 68. Thereby completing all needed repairs and changes that wheel assembly 60 may have required, in a manner that keeps user U safe, efficient and healthy.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for removing and replacing tires, comprising:
   a. a removing tool assembly including a removal tool, said removal tool including a removal tool shaft, said removal tool including a removal tool base mounted to a distal end of said removal tool shaft, said removal tool further including an extension holder opposite to said removal tool base at said distal end, an adjustable extension secured within said extension holder;
   b. a wheel assembly including a vehicle having a hub, said wheel assembly further including a wheel having a tire mounted thereon, said wheel mounted to said hub; and
   c. said removal tool base placed on said hub, said extension member extending between said hub and said wheel, a user grabs said removal tool and wiggles said removal tool up and down until said wheel comes off of said hub, said user subsequently being able to remove and replace said tire.

2. The system of claim 1, wherein said removal tool shaft is elongated and squared.

3. The system of claim 1, wherein said removal tool shaft includes an opening on both distal ends.

4. The system of claim 1, wherein said removal tool shaft is hollow.

5. The system of claim 1, wherein said adjustable extension is threaded, said adjustable extension is rotated in a predetermined direction within said extension holder to adjust the height of said adjustable extension to fit snuggly between the spacing created between said hub and said wheel.

6. The system of claim 1, wherein said adjustable extension includes an extension head at a top portion thereof, said extension head being domed.

7. The system of claim 1, wherein said extension holder, said adjustable extension and said removal tool base are perpendicular to said removal tool shaft.

8. The system of claim 1, wherein said extension holder and said adjustable extension extend vertically and away from said removal tool shaft.

9. The system of claim 1, wherein said removal tool base curves downwardly and away from said removal tool shaft.

10. The system of claim 1, wherein said removal tool base extends horizontally away from said removal tool shaft.

11. The system of claim 1, wherein said removal tool assembly includes a removal tool handle on said removal tool shaft opposite of said removal tool base, said removal tool handle being below said removal tool shaft.

12. The system of claim 1, wherein said extension holder is mounted atop of said removal tool shaft and said removal tool base is mounted beneath said removal tool shaft.

13. A system for removing and replacing tires, comprising:
   a. a lifting tool assembly including a lifting tool having a lifting tool shaft, a lifting base mounted to a distal end of said lifting tool shaft, said lifting base horizontally extending away from lifting tool shaft, said lifting tool assembly further including an inserting portion on said lifting tool shaft, said lifting portion being below said lifting base, said lifting base is angled downwardly at a predetermined angle;
   b. a wheel assembly including a wheel having a tire mounted thereon, said wheel having lug nut openings; and
   c. said wheel with said tire adapted to being mounted on a vehicle, said wheel being flat on a ground surface, said inserting portion being inserted into said lug nut opening and said lifting base being in abutting contact with said wheel, said lifting tool being perpendicular to said wheel, said lifting tool being grasped by a user and said user pulls and rocks said lifting tool towards themselves to lift said wheel.

14. The system of claim 13, wherein said lifting tool include a lifting tool handle on an underside of said lifting tool shaft.

15. The system of claim 13, wherein said lifting tool shaft extends through said lifting base towards a distal end of said lifting base.

16. The system of claim 13, wherein said lifting base includes two rectangular portions which are slanted towards each other and create a V shape at a meeting point of the two rectangular portions.

17. A system for removing and replacing tires, comprising:
   a. a removing tool assembly including a removal tool, said removal tool including a removal tool shaft, said removal tool shaft being elongated and squared, said removal tool including a first distal end and a second distal end, said removal tool shaft having an opening at each of said first and second distal end, said removal tool shaft being hollow, said removal tool including a removal tool base mounted perpendicularly to said first distal end of said removal tool shaft, said removal tool base being mounted underneath of said removal tool shaft, said removal tool base extending horizontally and away from said removal tool shaft, said removal tool base being curved downwardly and away from said removal tool shaft, said removal tool further including an extension holder opposite to said removal tool base at said first distal end, said extension holder being perpendicular to said removal tool shaft and being atop of said removal base shaft, an adjustable extension secured within said extension holder, said adjustable extension being threaded and rotated in a predetermined direction within said extension holder to adjust the height of said adjustable extension, said adjustable extension including an extension head at a top portion thereof, said extension head being domed, said removal tool including a removal tool handle at said second distal end, said removal tool handle being mounted underneath of said removal tool shaft;

b. a wheel assembly including a vehicle having a hub, said wheel assembly further including a wheel having a tire mounted thereon, said wheel mounted to said hub, said wheel additionally including lug nut openings;

c. said removal tool base placed on said hub, said extension member extending between said hub and said wheel, said extension member adjusted in height until it is snuggly fitted by having said extension head making contact with a periphery of said wheel, a user grabs said removal tool and wiggles said removal tool up and down until said wheel comes off of said hub, said user subsequently being able to remove and replace said tire;

d. a lifting tool assembly including a lifting tool having a lifting tool shaft, said lifting tool shaft being elongated and circular, said lifting tool shaft including a first end and a second end, said lifting base mounted to said first end of said lifting tool shaft, said lifting base horizontally extending away from lifting tool shaft, said lifting base being angled downwardly a predetermined angle, said lifting tool assembly further including an inserting portion on said lifting tool shaft on said first end, said lifting portion being below said lifting base, said lifting tool including a lifting tool handle on an underside of said lifting tool shaft on said second end, said lifting tool shaft extends through said lifting base towards a distal end of said lifting base, wherein said lifting base includes two rectangular portions which are slanted towards each other and create a V shape at a meeting point of the two rectangular portions; and e. said wheel with said tire adapted to being mounted on a vehicle after repairs and replacing to said tire completed, said wheel being flat on a ground surface once said tire is replaced, said inserting portion being inserted into said lug nut opening and said lifting base being in abutting contact with said wheel, said lifting tool being perpendicular to said wheel, said lifting tool being grasped by a user and said user pulls and rocks said lifting tool towards themselves to lift said wheel for mounting to said vehicle.

\* \* \* \* \*